United States Patent
Jang et al.

(10) Patent No.: US 9,886,144 B2
(45) Date of Patent: Feb. 6, 2018

(54) CAPACITIVE TYPE TOUCH SENSOR

(71) Applicant: Samsung Display Co., Ltd., Yongin (KR)

(72) Inventors: Hyoung-Wook Jang, Yongin (KR); Soon-Sung Ahn, Yongin (KR); Ja-seung Ku, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 140 days.

(21) Appl. No.: 14/504,158

(22) Filed: Oct. 1, 2014

(65) Prior Publication Data
US 2015/0109244 A1 Apr. 23, 2015

(30) Foreign Application Priority Data

Oct. 23, 2013 (KR) .......................... 10-2013-0126450

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| 7,812,827 | B2 * | 10/2010 | Hotelling | G06F 3/0416 345/156 |
|---|---|---|---|---|
| 9,098,153 | B2 * | 8/2015 | Shen | G06F 3/0416 |
| 2011/0037724 | A1 * | 2/2011 | Paulsen | G06F 3/0416 345/174 |
| 2011/0084857 | A1 * | 4/2011 | Marino | G06F 3/044 341/5 |
| 2012/0182259 | A1 | 7/2012 | Han | |
| 2013/0176274 | A1 * | 7/2013 | Sobel | G06F 3/0416 345/174 |
| 2015/0109244 | A1 * | 4/2015 | Jang | G06F 3/0416 345/174 |
| 2016/0124566 | A1 * | 5/2016 | Kwon | G06F 3/0416 345/174 |

FOREIGN PATENT DOCUMENTS

KR 10-2012-0082207 7/2012
KR 10-2012-0095376 8/2012

* cited by examiner

*Primary Examiner* — Kent Chang
*Assistant Examiner* — Nathan Brittingham
(74) *Attorney, Agent, or Firm* — H.C. Park & Associates, PLC

(57) ABSTRACT

A capacitive type touch sensor, includes a plurality of driving electrodes, a plurality of sensing electrodes disposed to overlap the driving electrodes, the sensing electrodes and the driving electrodes being spaced apart from each other, a driving unit configured to supply driving signals to the respective driving electrodes, and a sensing unit configured to detect sensing signals from the sensing electrodes, wherein the driving signals supplied by the driving unit include at least one of a first driving signal having a first frequency and a second driving signal having a second frequency different from the first frequency.

16 Claims, 5 Drawing Sheets

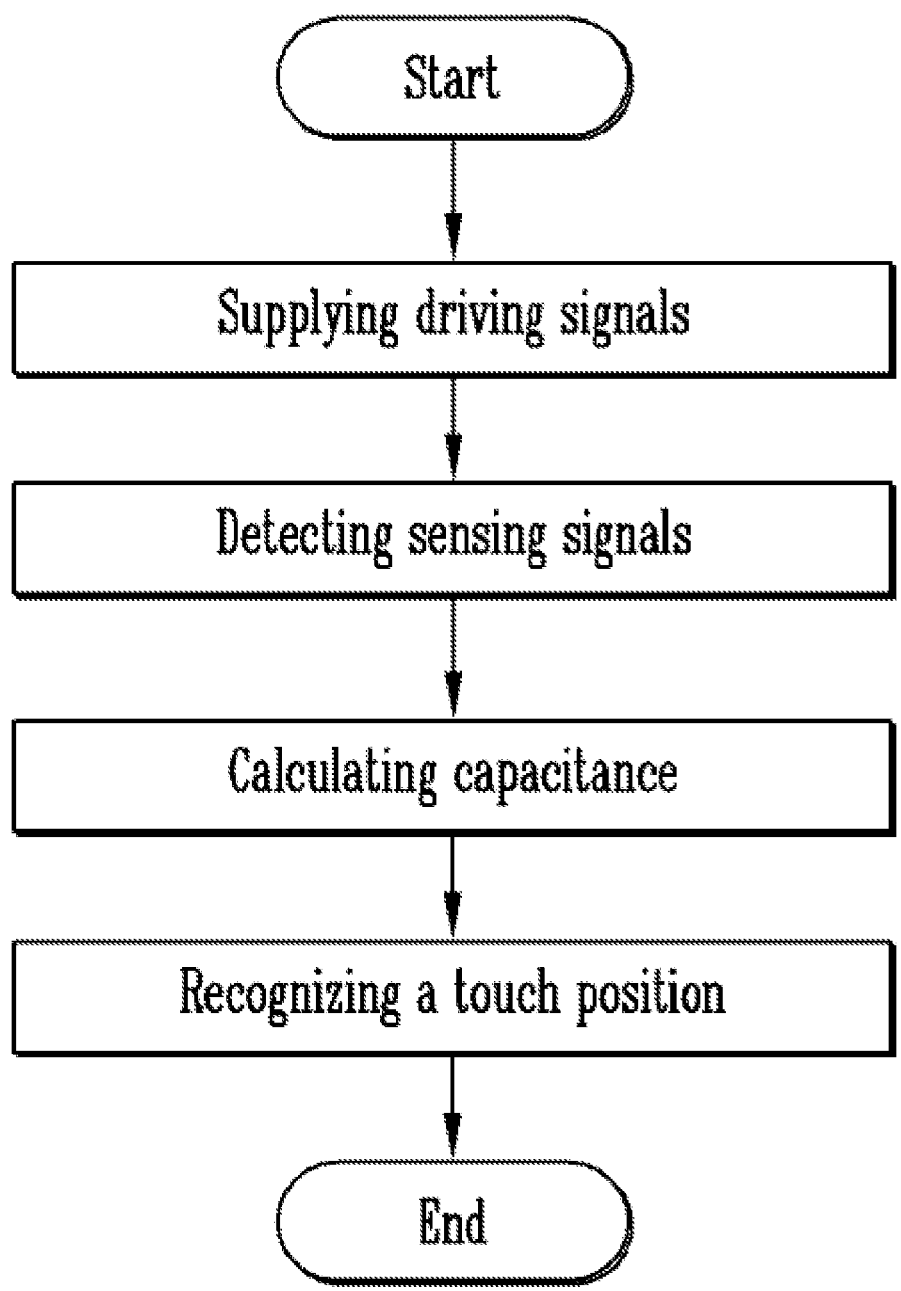

CAPACITIVE TYPE TOUCH SENSOR

CROSS REFERENCE TO RELATED APPLICATION

This application claims priority to and the benefit of Korean Patent Application No. 10-2013-0126450, filed on Oct. 23, 2013, which is hereby incorporated by reference for all purposes as if fully set forth herein.

BACKGROUND

Field

Exemplary embodiments of the present invention relate to a new capacitive type touch sensor which can improve touch sensitivity.

Discussion of the Background

Recently, a digitizer, a touch screen, and the like are widely used, which can replace existing input devices such as a keyboard and a mouse by directly detecting a contact position of a user's hand or object.

Each of these devices has a touch sensor configured to detect a touch position. The touch sensor may include a capacitive type touch sensor, a resistive overlay type touch sensor, a photosensitive type touch sensor, etc.

Among these touch sensors, the capacitive type touch sensor may recognize a touch position by detecting a point at which capacitance has changed according to the contact of a user's hand or object. The capacitive type touch sensor has recently come into wide use because of its easy detection of a multi-touch and excellent accuracy.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a capacitive type touch sensor with improve touch sensitivity.

Additional features of the invention will be set forth in the description which follows, and in part will be apparent from the description, or may be learned by practice of the invention.

An exemplary embodiment of the present invention discloses a capacitive type touch sensor, including a plurality of driving electrodes, a plurality of sensing electrodes disposed to overlap the driving electrodes, the sensing electrodes and the driving electrodes being spaced apart from each other, a driving unit configured to supply driving signals to the respective driving electrodes, and a sensing unit configured to detect sensing signals from the sensing electrodes, wherein the driving signals supplied by the driving unit include at least one of a first driving signal having a first frequency and a second driving signal having a second frequency different from the first frequency.

An exemplary embodiment of the present invention also discloses a method of operating a capacitive type touch sensor, the method including supplying driving signals to a plurality of driving electrodes wherein the driving signals include a first driving signal having a first frequency and a second driving signal having a second frequency different from the first frequency, detecting sensing signals from a plurality of sensing electrodes corresponding to the supplied driving signals, calculating capacitance at overlap portions of the plurality of driving electrodes and the plurality of sensing electrodes using the sensing signals, and recognizing a touch position using the calculated capacitance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a flowchart of a process to determine a touch position of a touch input via the capacitance calculation unit, according to exemplary embodiments.

DETAILED DESCRIPTION

Figure 1:
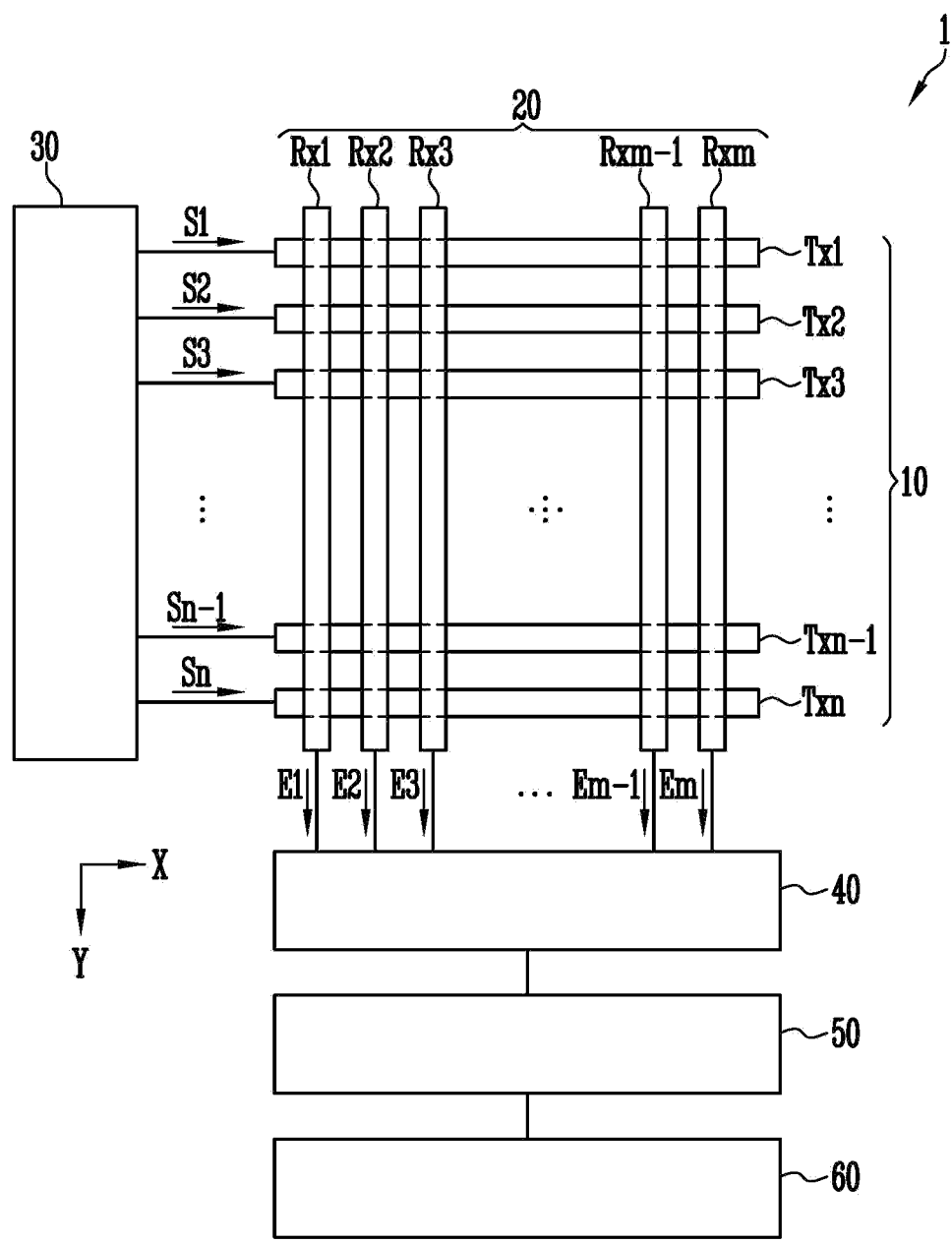
FIG. 1 is a diagram illustrating a capacitive type touch sensor according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
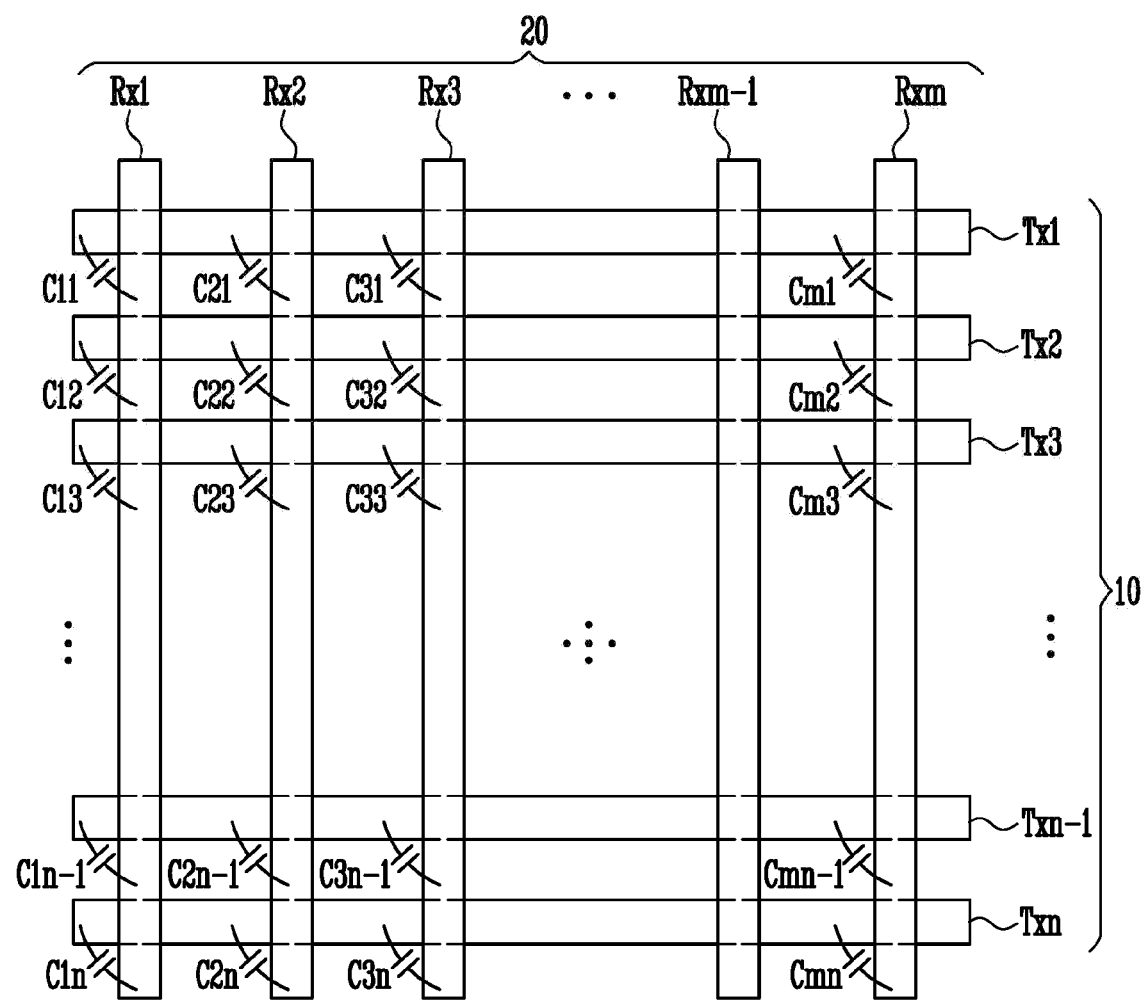
FIG. 2 is a diagram illustrating capacitances between driving electrodes and sensing electrodes, shown in FIG. 1.

FIG. 1 is a diagram illustrating a capacitive type touch sensor according to an exemplary embodiment of the present invention. FIG. 2 is a diagram illustrating capacitances between driving electrodes and sensing electrodes, shown in FIG. 1.

Referring to FIG. 1, the touch sensor 1 according to this exemplary embodiment may include a driving electrode 10, a sensing electrode 20, a driving unit 30, a sensing unit 40, and a capacitance calculation unit 50.

A plurality of driving electrodes 10 may be formed along the second direction (e.g., a Y-axis direction) extending in a first direction (e.g., an X-axis direction), wherein the second direction intersects the first direction. For example, the driving electrode 10 may include first to n-th driving electrodes Tx1 to Txn, as illustrated in FIG. 1.

The sensing electrode 20 is arranged to be spaced apart from the driving electrode 10, so that the driving electrode 10 and the sensing electrode 20 can be operated as a capacitive type touch sensor.

The sensing electrode 20 may be disposed to overlap the driving electrode 10. Although it has been illustrated in FIG. 1 that the driving electrode 10 is positioned below the sensing electrode 20, the driving electrode 10 may be positioned above the sensing electrode 20.

A plurality of sensing electrodes 20 may be formed along the first direction extending in the second direction. For example, the sensing electrode 20 may include first to m-th sensing electrodes Rx1 to Rxm as illustrated in FIG. 1.

Through the arrangement of the driving electrode 10 and the sensing electrode 20, mutual capacitance between the driving electrode 10 and the sensing electrode 20 is formed at a point where the driving electrode 10 and the sensing electrode 20 overlap each other. Each overlap point may operate as a sensing cell to implement touch recognition. For example, capacitance C11 may be formed between the first driving electrode Tx1 and the first sensing electrode Rx1, and capacitance Cmn may be formed between the n-th driving electrode Txn and the m-th sensing electrode Rxm.

The driving electrode 10 and the sensing electrode 20 may be formed of a transparent conductive material. However, the driving electrode 10 and the sensing electrode 20 may be formed of other conductive materials such as an opaque metal. For example, the driving electrode 10 and the sensing electrode 20 may be formed of indium tin oxide (ITO), indium zinc oxide (IZO), graphene, carbon nanotube, silver nanowires (AgNWs), or the like.

The driving unit 30 may supply driving signals S1 to Sn to the driving electrode 10. In this exemplary embodiment, the driving unit 30 may simultaneously supply the driving signals S1 to Sn respectively to the plurality of driving electrodes Tx1 to Txn. To this end, the driving unit 30 is electrically coupled to the plurality of driving electrodes Tx1 to Txn.

Figure 3:
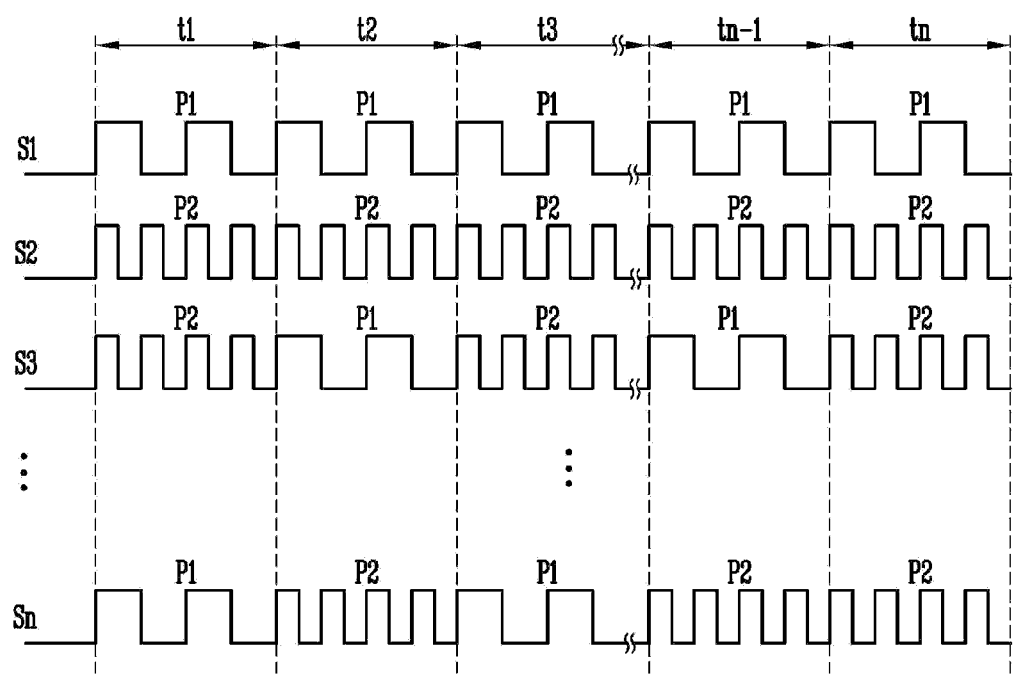
FIG. 3 is a waveform diagram illustrating driving signals according to an exemplary embodiment of the present invention.

FIG. 3 is a waveform diagram illustrating driving signals according to an exemplary embodiment of the present invention.

Referring to FIG. 3, each driving signal S1 to Sn according to this exemplary embodiment may include at least one of a first driving signal P1 having a first frequency f1 and a second driving signal P2 having a second frequency f2.

For example, the driving signal S1 supplied to the first driving electrode Tx1 may include the first driving signal P1 having the first frequency f1, and the driving signal S2 supplied to the second driving electrode Tx2 may include the second driving signal P2 having the second frequency f2. In addition, each of the driving signal S3 supplied to the third driving electrode Tx3 and the driving signal Sn supplied to the n-th driving electrode Txn may include the first driving signal P1 having the first frequency f1 and the second driving signal P2 having the second frequency f2.

Accordingly, the driving electrode 10 can receive the driving signals S1 to Sn having different frequencies for each driving period t1 to tn.

In this exemplary embodiment, the driving unit 30 may supply the driving signals S1 to Sn to the driving electrode 10 with reference to a predetermined code matrix Mcode. The code matrix Mcode may be stored in a separate memory (not shown).

The code matrix Mcode may include driving codes D set for each driving electrode Tx1 to Txn and for each driving period t1 to tn. For example, the code matrix Mcode may include the following n×n matrix.

$$\begin{bmatrix} D(t1, Tx1) & D(t1, Tx2) & D(t1, Tx3) & \cdots & D(t1, Txn) \\ D(t2, Tx1) & D(t2, Tx2) & D(t2, Tx3) & \cdots & D(t2, Txn) \\ D(t3, Tx1) & D(t3, Tx2) & D(t3, Tx3) & \cdots & D(t3, Txn) \\ \vdots & \vdots & \vdots & & \vdots \\ D(tn-1, Tx1) & D(tn-1, Tx2) & D(tn-1, Tx3) & \cdots & D(tn-1, Txn) \\ D(tn, Tx1) & D(tn, Tx2) & D(tn, Tx3) & \cdots & D(tn, Txn) \end{bmatrix}$$

In other words, each row of the code matrix Mcode includes driving codes corresponding to the respective driving electrodes for each specific period, and each column of the code matrix Mcode includes driving codes corresponding to the respective driving periods for each specific driving electrode.

For example, an n-th row of the code matrix Mcode may include driving codes D(tn,Tx1), D(tn,Tx2), . . . , and D(tn,Txn) corresponding to the respective driving electrodes Tx1 to Txn in a driving period tn. On the other hand, an n-th column of the code matrix Mcode may include driving codes D(t1,Txn), D(t2,Txn), . . . , and D(tn,Txn) corresponding to the respective driving periods t1 to tn of the n-th driving electrode Txn.

Each driving code D included in the code matrix Mcode may have a value of A or −A. Here, the A may be set to a natural number.

In this exemplary embodiment, an embodiment of the code matrix Mcode may be shown as follows.

$$\begin{bmatrix} A & -A & -A & \cdots & A \\ A & -A & A & \cdots & -A \\ A & -A & -A & \cdots & A \\ \vdots & \vdots & \vdots & & \vdots \\ A & -A & A & \cdots & -A \\ A & -A & -A & \cdots & -A \end{bmatrix}$$

The driving unit 30 may control the driving signals S1 to Sn with reference to the driving code D of the code matrix Mcode.

For example, in a case where the specific driving code is set to A, the driving unit 30 may supply the first driving signal P1 to a corresponding driving electrode for a corresponding driving period. In a case where the specific driving code is set to −A, the driving unit 30 may supply the second driving signal P2 to a corresponding driving electrode for a corresponding driving period.

According the current exemplary embodiment, the driving codes in the first column of the code matrix Mcode for the first driving electrode Tx1 during all the driving periods t1 to tn have A. Therefore, the driving unit 30 may supply the first driving signal P1 having the first frequency f1 to the first driving electrode Tx1 during all the driving periods t1 to tn.

In case of the second column of the code matrix Mcode for the second driving electrode Tx2, the driving codes during all the driving periods t1 to tn have −A. Therefore, the driving unit 30 may supply the second driving signal P2 having the second frequency f2 to the second driving electrode Tx2 during all the driving periods t1 to tn.

In case of the third column of the code matrix Mcode for the third driving electrode Tx3, the driving code has −A in the first driving period t1, has A in the second driving period t2, has −A in the third driving period t3, has A in the (tn−1)-th driving period tn−1, and has −A in the n-th driving period tn.

Accordingly, the driving unit 30 may supply the second driving signal P2 to the third driving electrode Tx3 during the first driving period t1, the first driving signal P1 to the third driving electrode Tx3 during the second driving period t2, the second driving signal P2 to the third driving electrode Tx3 during the third driving period t3, the first driving signal P1 to the third driving electrode Tx3 during the (n−1)-th driving period tn−1, and the second driving signal P2 to the third driving electrode Tx3 during the n-th driving period tn.

In case of the n-th column of the code matrix Mcode for the n-th driving electrode Txn, the driving code has A in the first driving period t1, has −A in the second driving period t2, has A in the third driving period t3, has −A in the (n−1)-th driving period tn−1, and has −A in the n-th driving period tn.

Accordingly, the driving unit 30 may supply the first driving signal P1 to the n-th driving electrode Txn during the first driving period t1, the second driving signal P2 to the n-th driving electrode Txn during the second driving period t2, the first driving signal P1 to the n-th driving electrode Txn during the third driving period t3, the second driving signal P2 to the n-th driving electrode Txn, and the second driving signal P2 to the n-th driving electrode Txn during the n-th driving period tn.

In an exemplary embodiment, in order to easily calculate the inverse matrix of the code matrix Mcode, A may be set to 1.

In this exemplary embodiment, the code matrix Mcode may be shown as follows.

$$\begin{bmatrix} 1 & -1 & -1 & \cdots & 1 \\ 1 & -1 & 1 & \cdots & -1 \\ 1 & -1 & -1 & \cdots & 1 \\ \vdots & \vdots & \vdots & & \vdots \\ 1 & -1 & 1 & \cdots & -1 \\ 1 & -1 & -1 & \cdots & -1 \end{bmatrix}$$

The sensing unit 40 may detect sensing signals E1 to Em from the sensing electrodes 20.

According to an exemplary embodiment, the sensing unit 40 may detect sensing signals E1 to Em from the respective sensing electrodes Rx1 to Rxm for each driving period t1 to tn.

The capacitance calculation unit 50 may calculate capacitances C11 to Cmn between the driving electrode 10 and the sensing electrode 20, from the sensing signals E1 to Em detected by the sensing unit 40, and the code matrix Mcode.

Figure 4:
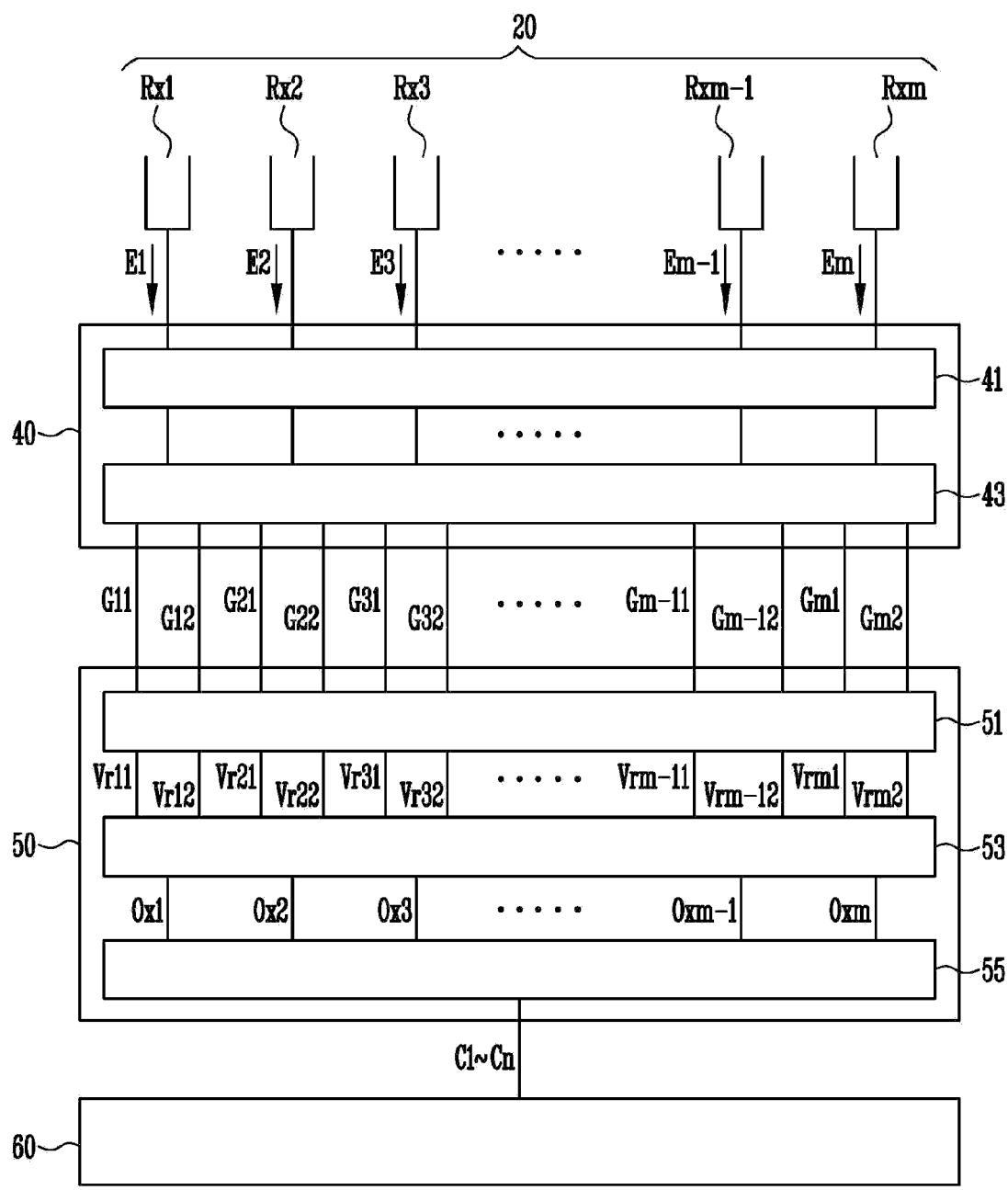
FIG. 4 is a diagram illustrating a sensing unit and a capacitance calculation unit according to the exemplary embodiment of the present invention.

FIG. 4 is a diagram illustrating the sensing unit and the capacitance calculation unit according to the exemplary embodiment of the present invention. FIG. 5 is a flowchart of a process to determine a touch position of a touch input via the capacitance calculation unit, according to exemplary embodiments.

Referring to FIG. 4, the sensing unit 40 according to this exemplary embodiment may include filtering unit 43 configure to filter the sensing signals E1 to Em from the sensing electrode 20 into first sensing signals G11, G21, . . . , Gm−11, and Gm1 having a first frequency f1 and second sensing signals G12, G22, . . . , Gm−12, and Gm2 having a second frequency f2, respectively.

More specifically, the filtering unit 43 may separate the sensing signals E1 to Em from the respective sensing electrodes Rx1 to Rxm during each driving period t1 to tn, into the first sensing signals G11, G21, . . . , Gm−11, and Gm1 and the second sensing signals G12, G22, . . . , Gm−12, and Gm2, respectively.

For example, the sensing signal E1 from the first sensing electrode Rx1 may be separated by the filtering unit 43 into the first sensing signal G11 having the first frequency f1 and the second sensing signal G12 having the second frequency f2. The sensing signal E2 from the second sensing electrode Rx2 may be separated, by the filtering unit 43, into the first sensing signal G21 having the first frequency f1 and the second sensing signal G22 having the second frequency f2. The sensing signal Em from the m-th sensing electrode Rxm may be separated, by the filtering unit 43, into the first sensing signal Gm1 having the first frequency f1 and the second sensing signal Gm2 having the second frequency f2.

The sensing unit 40 according to this exemplary embodiment may further include an amplifying unit 41 configured to amplifying the sensing signals E1 to Em from the sensing electrode 20.

In this exemplary embodiment, the amplifying unit 41 may amplify and transfer the sensing signals E1 to Em to the filtering unit 43.

Referring to FIG. 4, the capacitance calculation unit 50 according to this exemplary embodiment may further include a first calculation unit 51, a second calculation unit 53, and a third calculation unit 55.

The first calculation unit 51 may calculate and output representative values Vr11($t$), Vr21($t$), . . . , Vrm−11(t), and Vrm1($t$) of the first sensing signals G11, G21, . . . , Gm−11, and Gm1, and representative values Vr12($t$), Vr22($t$), . . . , Vrm−12(t), and Vrm2($t$) of the second sensing signals G12, G22, . . . , Gm−12, and Gm2, respectively for each driving period.

In this exemplary embodiment, the representative value may be determined by the root-mean-square value of the first sensing signal G11, G21, . . . , Gm−11, or Gm1 and the second sensing signal G12, G22, . . . , Gm−12, or Gm2, etc.

For example, the first sensing signal Gm1 from the m-th sensing electrode Rxm, may be calculated by the first calculation unit 51 into a representative value Vrm1($t$) for each driving period t1 to tn.

Specifically, the first calculation unit 51 may calculate a representative value Vrm1($t1$) of the first sensing signal Gm1 during the first driving period t1, a representative value Vrm1($t2$) of the first sensing signal Gm1 during the second driving period, . . . , and a representative value Vrm1($tn$) of the first sensing signal Gm1 during the n-th driving period tn. As a result, the first calculation unit 51 may calculate the representative value Vrm1($t1$) to Vrm1($tn$) of the first sensing signal Gm1 for each driving period.

Accordingly, the second sensing signal Gm2 from the m-th sensing electrode Rxm, may be calculated by the first calculation unit 51 into a representative value Vrm2($t$) for each driving period.

Specifically, the first calculation unit 51 may calculate a representative value Vrm2($t1$) of the second sensing signal Gm2 during the first driving period t1, a representative value Vrm2($t2$) of the second sensing signal Gm2 during the second period t2, . . . , and a representative value Vrm2($tn$) of the second sensing signal Gm2 during the n-th driving period tn. As a result, the first calculation unit 51 may calculate the representative value Vrm2(t1) to Vrm2(tn) of the second sensing signal Gm2 for each driving period.

The representative values Vr11(t) to Vrm−11(t) of the other first sensing signals G11 to Gm−11 for each driving period and the representative values Vr12(t) to Vrm−12(t) of the other second sensing signals G12 to Gm−12 for each driving period may also be calculated in the same manner.

In this exemplary embodiment, in order to facilitate the calculation, the first calculation unit 51 may control at least one of the representative values Vr11(t), Vr12(t), . . . , Vrm−11(t), and Vrm1(t) of the first sensing signals G11, G21, . . . , Gm−11, and Gm1, and the representative values Vr12(t), Vr22(t), . . . , Vrm−12(t), and Vrm2(t) of the second sensing signals G12, G22, . . . , Gm−12, and Gm2.

The second calculation unit 53 may calculate output values Ox1(t), Ox2(t), . . . , Oxm−1(t), and Oxm(t) of the sensing electrodes Rx1 to Rxm for each driving period by subtracting the representative values Vr12(t), Vr22(t), . . . , Vrm−12(t), and Vrm2(t) of the second sensing signals G12, G22, . . . , Gm−12, and Gm2 from the representative values Vr11(t), Vr21(t), . . . , Vrm−11(t), and Vrm1(t) of the first sensing signals G11, G21, . . . , Gm−11, and Gm1, respectively for each driving period.

In other words, the output values Ox1(t), Ox2(t), . . . , Oxm−1(t), and Oxm(t) of the sensing electrodes Rx1 to Rxm for each driving period may be calculated from representative values of the first sensing signals and the second sensing signals, corresponding to the same sensing electrode.

For example, the output value Ox1(t) of the first sensing electrode Rx1 for each driving period may be calculated from the difference between the representative value Vr11(t) of the first sensing signal G11 and the representative value Vr12(t) of the second sensing signal G12 from the first sensing electrode Rx1.

In similar way, the output value Oxm(t) of the m-th sensing electrode Rxm for each driving period may be calculated from the difference between the representative value Vrm1(t) of the first sensing signal Gm1 and the representative value Vrm2(t) of the second sensing signal Gm2 from the m-th sensing electrode Rxm.

The output values Ox1(t), Ox2(t), . . . , Oxm−1(t), and Oxm(t) of the sensing electrodes Rx1 to Rxm for each driving period may be calculated between representative values corresponding to the same sensing electrode.

For example, the output values Ox1(tn), Ox2(tn), . . . , Oxm−1(tn), and Oxm(tn) during the n-th driving period tn may be respectively calculated from the differences between the representative values Vr11(tn), Vr21(tn), . . . , Vrm−11 (tn), and Vrm1 (tn) of the first sensing signals G11, G21, Gm−11, and Gm1 and the representative values Vr12(tn), Vr22(tn), . . . , Vrm−12(tn), and Vrm2(tn) of the second sensing signals G12, G22, . . . , Gm−12, and Gm2, during the n-th driving period tn.

Therefore, the output value Oxm(t1) to Oxm(tn) of the m-th sensing electrode Rxm for each driving period may be calculated as shown in the following Table 1.

TABLE 1

| Driving period | Representative value of first sensing signal Gm1 for each driving period | Representative value of second sensing signal Gm2 for each driving period | Output value of n-th sensing electrode Rxn for each driving period |
| --- | --- | --- | --- |
| t1 | Vrm1(t1) | Vrm2(t1) | Oxm(t1) = Vrm1(t1) − Vrm2(t1) |
| t2 | Vrm1(t2) | Vrm2(t2) | Oxm(t2) = Vrm1(t2) − Vrm2(t2) |

TABLE 1-continued

| Driving period | Representative value of first sensing signal Gm1 for each driving period | Representative value of second sensing signal Gm2 for each driving period | Output value of n-th sensing electrode Rxn for each driving period |
| --- | --- | --- | --- |
| t3 | Vrm1(t3) | Vrm2(t3) | Oxm(t3) = Vrm1(t3) − Vrm2(t3) |
| — | — | — | — |
| tn − 1 | Vrm1(tn − 1) | Vrm2(tn − 1) | Oxm(tn − 1) = Vrm1(tn − 1) − Vrm2(tn − 1) |
| tn | Vrm1(tn) | Vrm2(tn) | Oxm(tn) = Vrm1(tn) − Vrm2(tn) |

The output values Ox1(t) to Oxm−1(t) of the other sensing electrodes Rx1 to Rxm−1 for each driving period may also be calculated in the same manner.

The third calculation unit 55 may form an output matrix Mo from the values calculated in the second calculation unit 53, and calculate capacitances between the driving electrode 10 and the sensing electrode 20 through an operation of the output matrix Mo and the code matrix Mcode.

According to an exemplary embodiment, the third calculation unit 55 may form the output matrix for the sensing electrode 20, from the output values Ox1(t), Ox2(t), . . . , Oxm−1(t), and Oxm(t).

Therefore, the output matrix Mo of a specific sensing electrode may have following generalized form of n×1 matrix.

$$\begin{bmatrix} Ox(t1) \\ Ox(t2) \\ Ox(t3) \\ \vdots \\ Ox(tn-1) \\ Ox(tn) \end{bmatrix}$$

For example, the output matrix Mom of the m-th sensing electrode Rxm may be shown as the following n×1 matrix.

$$\begin{bmatrix} Oxm(t1) \\ Oxm(t2) \\ Oxm(t3) \\ \vdots \\ Oxm(tn-1) \\ Oxm(tn) \end{bmatrix}$$

The output matrices Mo1 to Mom−1 of the other sensing electrodes Rx1 to Rxm−1 may also be configured in the same manner.

The third calculation unit 55 may calculate capacitances between the driving electrode 10 and the sensing electrode 20 through following operations of the code matrix Mcode and the output matrices Mo1, Mo2, . . . , Mom−1, and Mom.

The capacitances between the driving electrode 10 and the sensing electrode 20 may be respectively formed at overlap portions of the driving electrode 10 and the sensing electrode 20. Therefore, the capacitances between a specific sensing electrode and a plurality of driving electrodes Tx1 to Txn may have following generalized form of n×1 matrix Mc.

$$\begin{bmatrix} C1 \\ C2 \\ C3 \\ \vdots \\ Cn-1 \\ Cn \end{bmatrix}$$

The capacitances C1, C2, C3, . . . , Cn−1, and Cn represent capacitance between the specific sensing electrode and a first driving electrode Tx1, a second driving electrode Tx2, a third driving electrode Tx3, an (n−1)-th driving electrode Txn−1, and an n-th driving electrode Txn, respectively.

For example, the m-th sensing electrode Rxm may have capacitances Cm1, Cm2, Cm3, . . . , Cm−1, and Cmn at overlap portions of the m-th sensing electrode Rxm and the first to n-th driving electrodes Tx1 to Txn, respectively.

Accordingly, the capacitances Cm1, Cm2, Cm3, . . . , Cm−1, and Cmn between the m-th sensing electrode Rxm and the plurality of driving electrodes Tx1 to Txn may be shown as the following n×1 matrix Mcm.

$$\begin{bmatrix} Cm1 \\ Cm2 \\ Cm3 \\ \vdots \\ Cmn-1 \\ Cmn \end{bmatrix}$$

The capacitances between the other sensing electrodes Rx1 to Rxm−1 and the driving electrodes Tx1 to Txn may also be shown as matrices Mc1 to Mcm−1 in the same manner.

In this exemplary embodiment, the output matrix Mo of the specific sensing electrode, the code matrix Mcode and the matrix Mc configured with the capacitances between the specific sensing electrode and the driving electrodes Tx1 to Txn may satisfy the following relation expression.

$$Mo = Mcode \times Mc \qquad \text{(Formula 1)}$$

Relation Expression 1 may be modified as follows.

$$Mc = Mcode^{-1} \times Mo \qquad \text{(Formula 2)}$$

In other words, the capacitances between the sensing electrode 20 and the driving electrode 10 may be calculated from the multiplication of the inverse matrix of the code matrix Mcode and the output matrix Mo.

For example, the capacitances Cm1, Cm2, Cm3, . . . , Cm−1, and Cmn between the m-th sensing electrode Rxm and the driving electrodes Tx1 to Txn may be calculated from the multiplication of the inverse matrix of the code matrix Mcode and the output matrix Mom. This may be calculated through the following relation expression.

$$Mcm = Mcode^{-1} \times Mom \qquad \text{(Formula 3)}$$

In this case, Formula 3 may be shown as following formula 4.

Formula 4

$$\begin{bmatrix} Cm1 \\ Cm2 \\ Cm3 \\ \vdots \\ Cmn-1 \\ Cmn \end{bmatrix} = \begin{bmatrix} D(t1,Tx1) & D(t1,Tx2) & D(t1,Tx3) & \cdots & D(t1,Txn) \\ D(t2,Tx1) & D(t2,Tx2) & D(t2,Tx3) & \cdots & D(t2,Txn) \\ D(t3,Tx1) & D(t3,Tx2) & D(t3,Tx3) & \cdots & D(t3,Txn) \\ \vdots & \vdots & \vdots & & \vdots \\ D(tn-1,Tx1) & D(tn-1,Tx2) & D(tn-1,Tx3) & \cdots & D(tn-1,Txn) \\ D(tn,Tx1) & D(tn,Tx2) & D(tn,Tx3) & \cdots & D(tn,Txn) \end{bmatrix}^{-1} \times \begin{bmatrix} Oxm(t1) \\ Oxm(t2) \\ Oxm(t3) \\ \vdots \\ Oxm(tn-1) \\ Oxm(tn) \end{bmatrix}.$$

Therefore, the third calculation unit 55 may calculate capacitances Cm1 to Cmn between the m-th sensing electrode Rxm and the driving electrodes Tx1 to Txn, respective, using Formula 4.

The capacitances C11 to Cm−1n between the other sensing electrodes Rx1 to Rxm−1 and the driving electrodes Tx1 to Txn may also be calculated in the same manner.

The touch sensor 1 according to this exemplary embodiment may further include a touch detection unit 60 configured to detect a touch position, using the capacitance calculated by the capacitance calculation unit 50.

In this exemplary embodiment, the touch detection unit 60 may detect a touch position by recognizing a change in capacitance.

For example, in a case where the capacitance Cm2 among the capacitances Cm1 to Cmn has a value that is lower than the other capacitances or a specific reference value, the touch detection unit 60 may recognize a touch at the overlap portion of the m-th sensing electrode Rxm and the second driving electrode Tx2.

In a similar manner, a touch position generated in the other sensing electrodes Rx1 to Rxm−1 may also be recognized.

According to an exemplary embodiment, the code matrix Mcode, the output matrix Mo, and matrix Mc, may be transposes of the respective matrices.

The touch sensor 1 according to this exemplary embodiment simultaneously supplies driving signals S1 to Sn having different frequencies, and the touch sensitivity of the touch sensor 1 can be improved, compared to the related art touch sensor which supplies a driving signal sequentially.

As described above, according to the present invention, it is possible to provide a new capacitive touch sensor with improve touch sensitivity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A capacitive type touch sensor, comprising:
a plurality of driving electrodes;
a plurality of sensing electrodes disposed to overlap the driving electrodes, the sensing electrodes and the driving electrodes being spaced apart from each other;
a driving unit configured to supply driving signals to the respective driving electrodes;
a sensing unit configured to detect sensing signals from the sensing electrodes; and
a capacitance calculation unit configured to calculate capacitance between the driving electrode and the sensing electrode,
wherein the driving signals supplied by the driving unit comprise at least one of a first driving signal having a first frequency and a second driving signal having a second frequency different from the first frequency,
wherein the driving unit is configured to supply one of the first driving signal and the second driving signal with reference to a code matrix comprising driving codes set for each driving electrode of the plurality of driving electrodes for each driving period,
wherein each row of the code matrix corresponds to each driving period, and each column of the code matrix corresponds to each driving electrode,
wherein each driving code of the code matrix corresponds to the respective driving electrode at the respective driving period,
wherein one of the driving electrodes is configured to receive one of the first driving signal and the second driving signal during respective driving periods, and
wherein the capacitance calculation unit is configured to calculate the capacitance using the sensing signals detected by the sensing unit and an inverse matrix of the code matrix.

2. The capacitive type touch sensor of claim 1, wherein the driving code comprises A and −A, wherein A is a natural number.

3. The capacitive type touch sensor of claim 2, wherein the A is 1.

4. The capacitive type touch sensor of claim 2, wherein the driving unit is configured to supply the first driving signal to a first driving electrode of the plurality of driving electrodes during a first driving period when a driving code corresponding to the first driving electrode and first driving period is set to A, and supply the second driving signal to a second driving electrode of the plurality of driving electrodes during a second driving period when a specific driving code corresponding to the second driving electrode and second driving period is set to −A.

5. The capacitive type touch sensor of claim 1, wherein the sensing unit comprises a filtering unit configured to filter the sensing signals from the sensing electrodes into a first sensing signal having the first frequency and a second sensing signal having the second frequency.

6. The capacitive type touch sensor of claim 5, wherein the capacitance calculation unit comprises:
a first calculation unit configured to calculate representative values of the first sensing signal and the second sensing signal for each driving period;
a second calculation unit configured to subtract the representative value of the second sensing signal from the representative value of the first sensing signal; and
a third calculation unit configured to form an output matrix using the value calculated by the second calculation unit, and calculate the capacitance between the driving electrode and the sensing electrode through an operation of the output matrix and the code matrix.

7. The capacitive type touch sensor of claim 6, wherein the third calculation unit is configured to calculate the capacitance between the driving electrode and the sensing electrode through the multiplication of the inverse matrix of the code matrix and the output matrix.

8. The capacitive type touch sensor of claim 1, further comprising a touch detection unit configured to recognize a touch position, using the capacitance calculated by the capacitance calculation unit.

9. The capacitive type touch sensor of claim 1, wherein the driving electrode and the sensing electrode comprise a transparent conductive material.

10. The capacitive type touch sensor of claim 5, wherein the sensing unit further comprises an amplifying unit configured to amplify the sensing signals from the sensing electrode.

11. The capacitive type touch sensor of claim 6, wherein the first calculation unit is configured to control at least one of the representative value of the first sensing signal and the representative value of the second sensing signal.

12. A method of operating a capacitive type touch sensor, the method comprising:
supplying driving signals to a plurality of driving electrodes wherein the driving signals comprise a first driving signal having a first frequency and a second driving signal having a second frequency different from the first frequency;
detecting sensing signals from a plurality of sensing electrodes corresponding to the supplied driving signals;
calculating capacitance at overlap portions of the plurality of driving electrodes and the plurality of sensing electrodes; and
recognizing a touch position using the calculated capacitance,
wherein the supplying driving signals comprises supplying one of the first driving signal and the second driving signal with reference to a code matrix comprising driving codes set for each driving electrode of the plurality of driving electrodes for each driving period,
wherein each row of the code matrix corresponds to each driving period, and each column of the code matrix corresponds to each driving electrode,
wherein each driving code of the code matrix corresponds to the respective driving electrode at the respective driving period,
wherein one of the driving electrodes is configured to receive one of the first driving signal and the second driving signal during respective driving periods, and wherein the capacitance at overlap portions of the plurality of driving electrodes and the plurality of sensing electrodes is calculated using the sensing signals and an inverse matrix of the code matrix.

13. The method of claim 12, wherein the detecting sensing signals further comprises filtering the sensing signals from the sensing electrodes into a first sensing signal having the first frequency and a second sensing signal having the second frequency.

14. The method of claim 13, wherein the calculating capacitance further comprises:
   calculating representative values of the first sensing signal and the second sensing signal for each driving period;
   subtracting the representative value of the second sensing signal from the representative value of the first sensing signal; and
   forming an output matrix using the calculated representative values and calculate the capacitance between the driving electrode and the sensing electrode through an operation of the output matrix and the code matrix.

15. The method of claim 13, wherein the detecting sensing signals further comprises amplifying the sensing signals from the sensing electrode.

16. The method of claim 14, wherein the calculating representative values further comprises controlling at least one of the representative value of the first sensing signal and the representative value of the second sensing signal.

* * * * *